Dec. 31, 1935. S. D. BUTTERWORTH 2,026,018
MECHANICAL MOVEMENT USEFUL FOR WHEEL MOUNTINGS
Filed May 11, 1934 4 Sheets-Sheet 1

INVENTOR.
SAMUEL D. BUTTERWORTH
BY
Barnes, Kisselle, Laughlin & Raisch
ATTORNEYS.

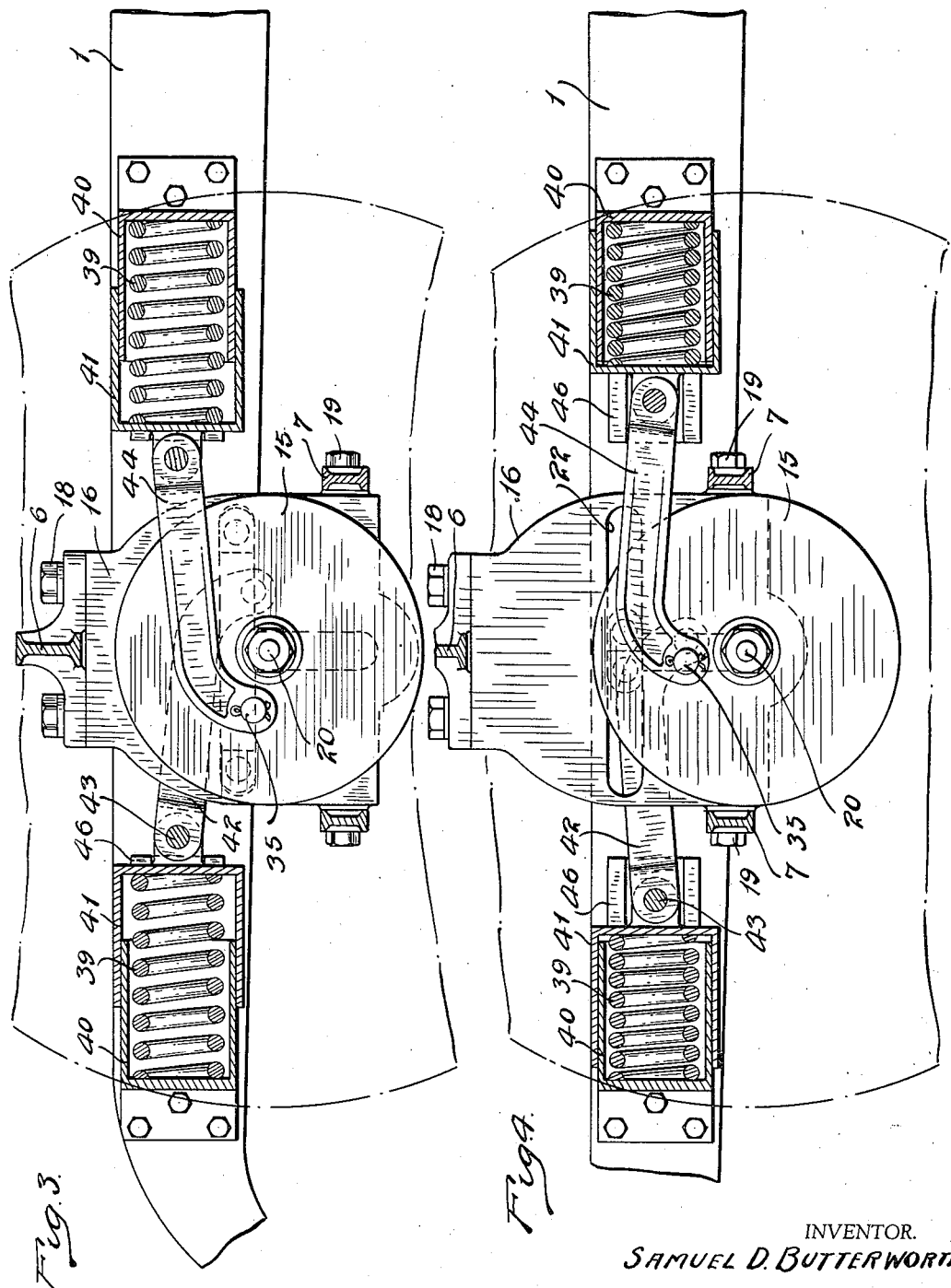

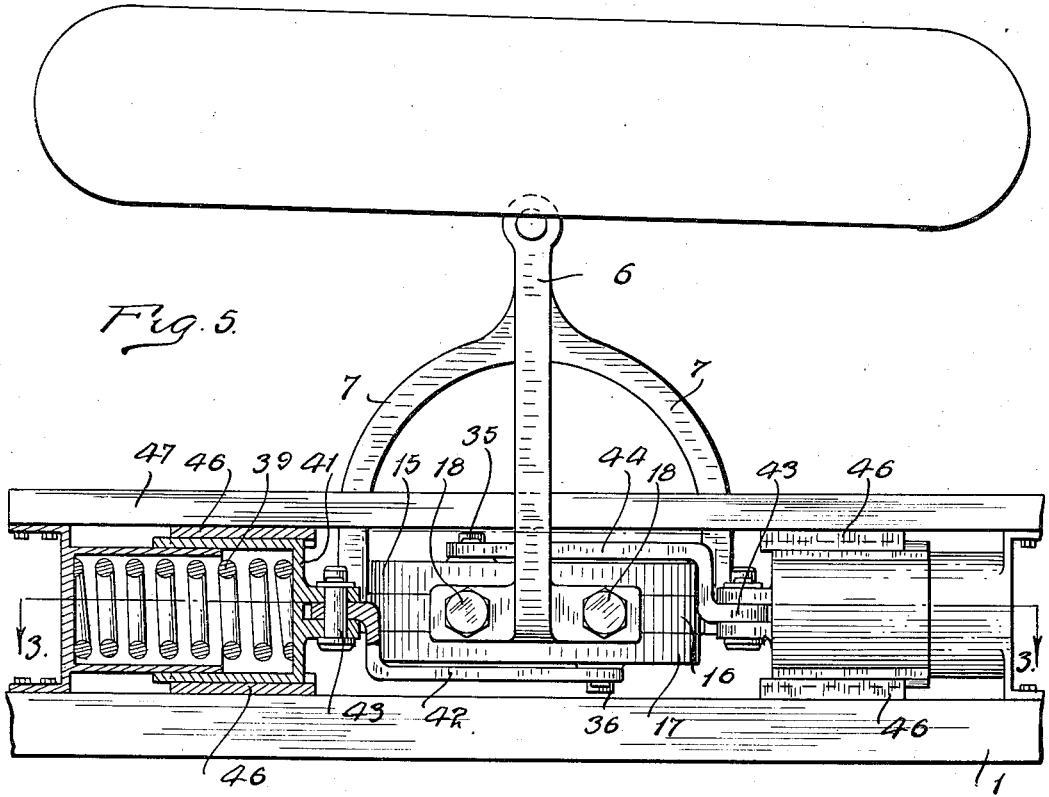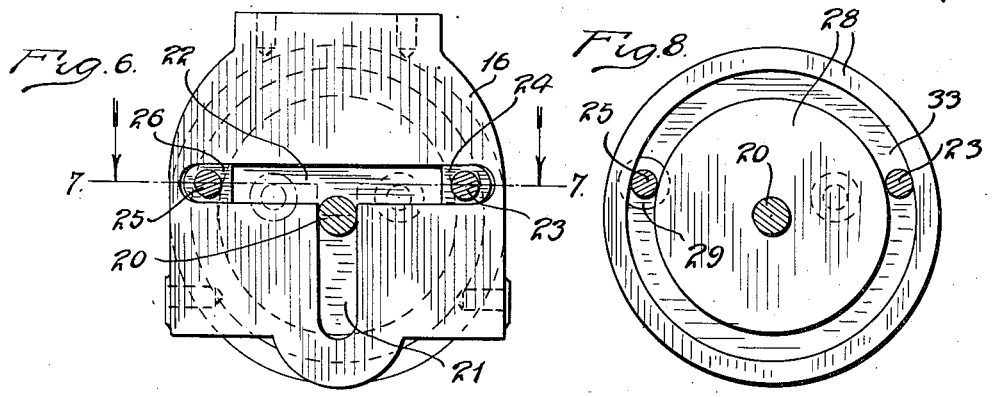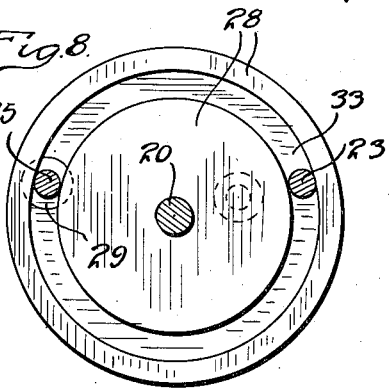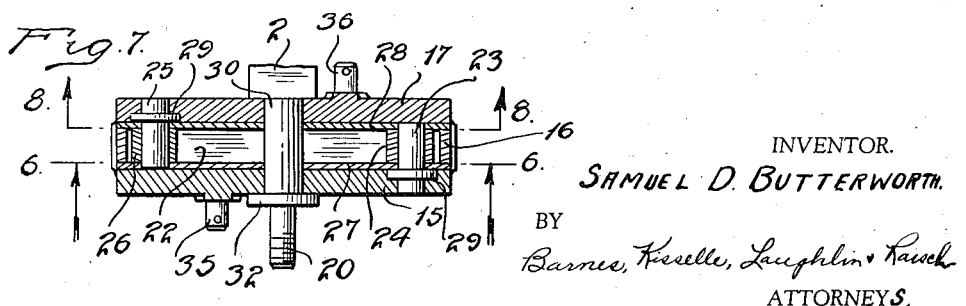

Dec. 31, 1935.     S. D. BUTTERWORTH     2,026,018
MECHANICAL MOVEMENT USEFUL FOR WHEEL MOUNTINGS
Filed May 11, 1934     4 Sheets-Sheet 4
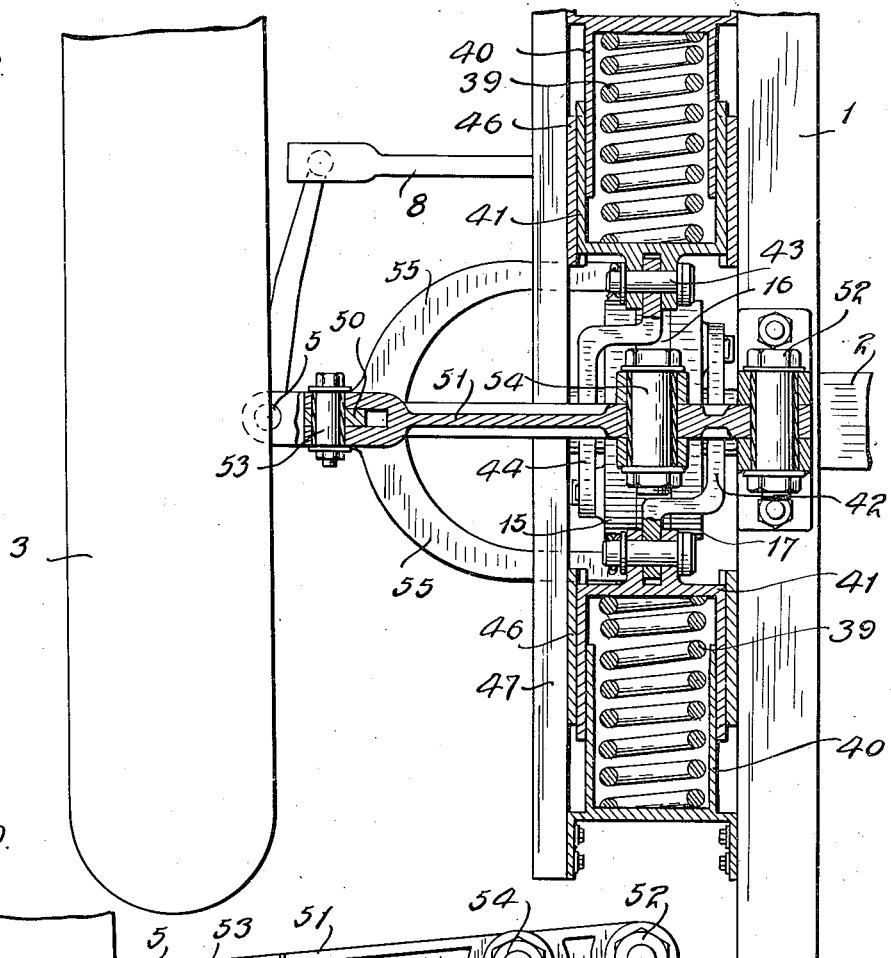
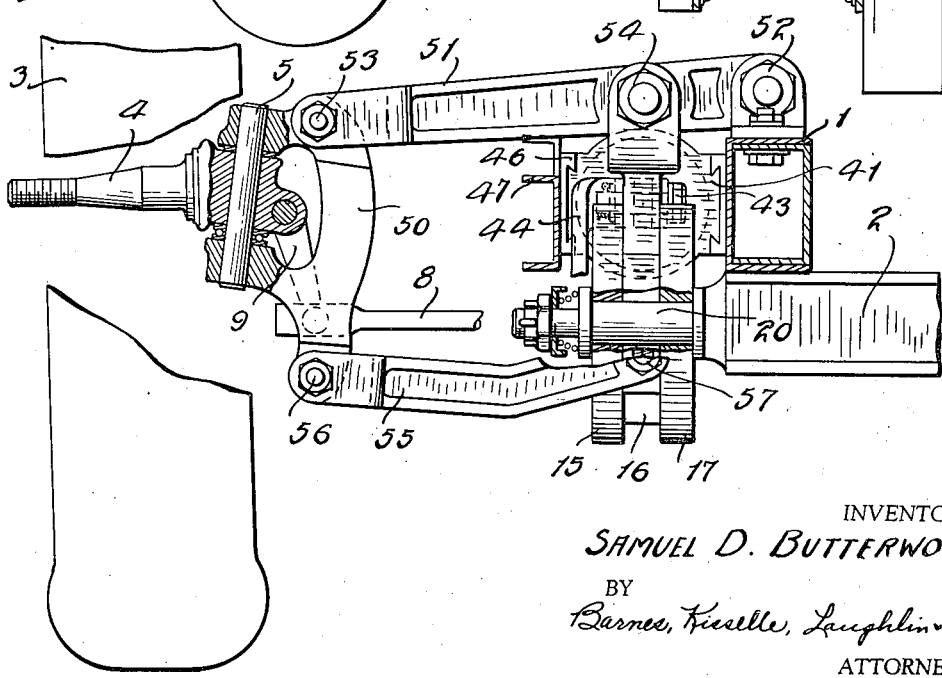
INVENTOR.
SAMUEL D. BUTTERWORTH.
BY
ATTORNEYS.

Patented Dec. 31, 1935

2,026,018

UNITED STATES PATENT OFFICE 2,026,018

MECHANICAL MOVEMENT USEFUL FOR WHEEL MOUNTINGS

Samuel D. Butterworth, Detroit, Mich.; Josephine Butterworth executrix of said Samuel D. Butterworth, deceased Application May 11, 1934, Serial No. 725,173

26 Claims. (Cl. 267—20)

This invention relates to a structure comprising a combination of movable parts useful for the individual spring mounting of vehicle wheels. The invention is thought to be particularly applicable for wheel mounting, and the disclosure herein, both as to description and as to drawings, is confined to a wheel mounting.

The invention aims to provide a structure for the resilient mounting of a wheel to a vehicle which embodies a strong rigid connection employing a minimum number of parts, and which may be arranged in such a manner as to reduce to a minimum the number of joints or places of pivotal action. Where the wheel is mounted by means of a combination of levers, as some of the wheels are today, quite a large number of pivots are used, and many of them require periodic lubrication and are subject to wear, which leads to objectionable noises and faulty operation when the wear causes looseness in the pivotal connections. The present invention may be embodied in the structure where pivotal connections, except for such connection as may be substantially inclosed and not exposed to dirt or dust, are eliminated. The invention also provides a structure wherein wheel movement relative to the vehicle frame may be in a substantially straight line, as distinguished from an arcuate movement or a movement wherein the wheel is cocked or rocked on the ground line, so that the wheel maintains a correct position relative to the frame, save for its movement relative to the frame due to road irregularities or the like. A further object of the invention is the provision of the structure wherein the resisting springs are flexed through a range of movement less than the movement of the wheel relative to the frame of the vehicle to the end that a long life for the spring or springs is assured. Still further, the invention contemplates the structure embodying a frictional action which effects a controlling action upon the flexure of the springs, so that spring flexure and spring rebound is not entirely free, thus to further insure long spring life.

Fig. 3 is a sectional view taken substantially on line 3—3 of Fig. 5, showing the spring arrangement and the operating devices for the springs.

Fig. 4 is a view similar to Fig. 3, showing the parts in a position with the springs substantially collapsed.

Fig. 5 is a horizontal view partly in section and partly in plan, showing the mounting and spring arrangement.

Fig. 6 is a sectional view taken substantially on line 6—6 of Fig. 7, showing the structure of one of the members used for obtaining wheel movement.

Fig. 7 is a sectional view taken on line 7—7 of Fig. 6.

Fig. 8 is a view taken substantially on line 8—8 of Fig. 7, showing the phase of another one of the movable members.

Fig. 9 is a view partly in section, showing a modified form of the invention.

Fig. 10 is a view partly in section and partly in plan showing the modified form.

Opposite frame members of a vehicle are illustrated at 1, and the wheel mountings may be attached to the frame members in any suitable manner, although as shown herein a cross-member 2 extends transversely across the frame suitably united to the frame members 1. This member 2 is, strictly speaking, not an axle, yet it extends across the frame similar to an axle and serves to strengthen the frame.

Figure 1:
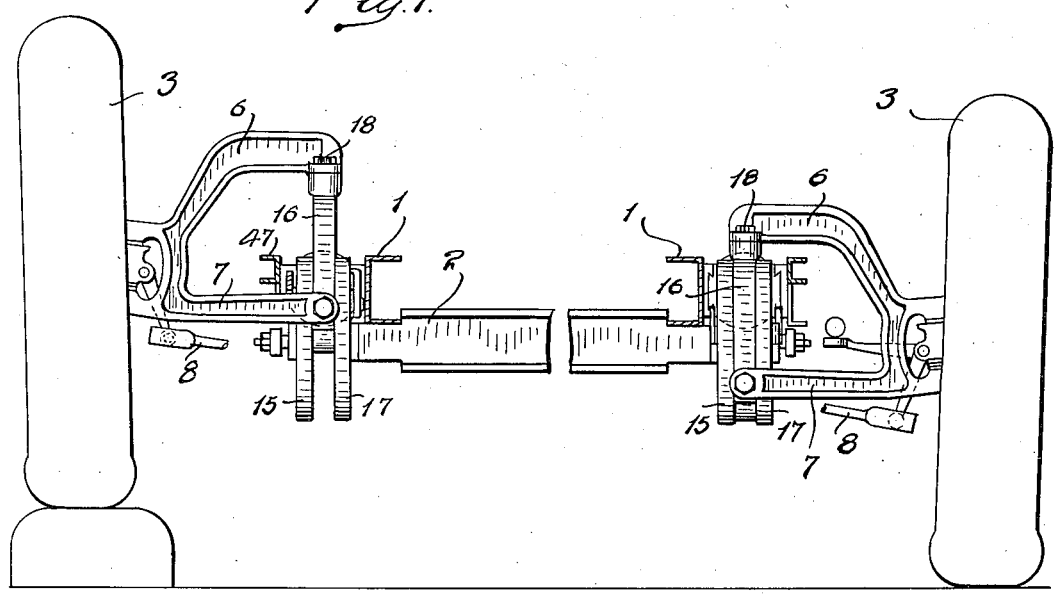
Fig. 1 is a view illustrating opposite wheels mounted by a structure made in accordance with the invention, showing the wheels in different positions.
Figure 2:
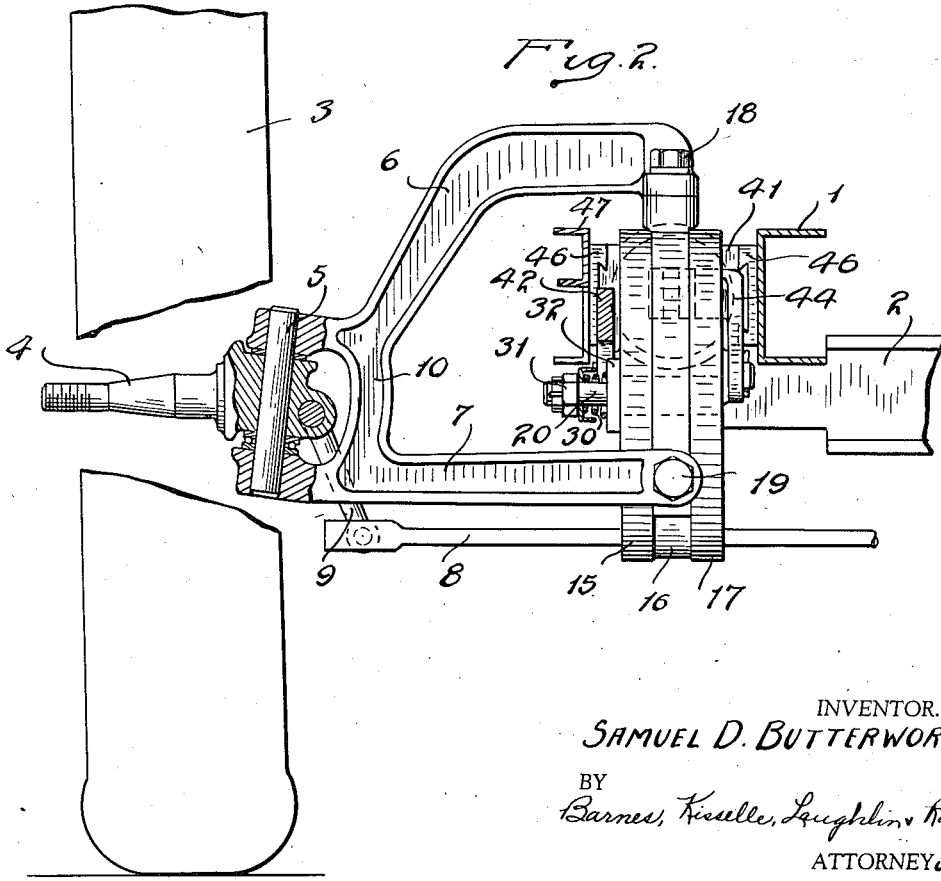
Fig. 2 is an enlarged detail with some parts shown in section.

A front end arrangement of the vehicle is shown herein embodying dirigible wheels. The wheels are shown at 3, and as illustrated in Fig. 2, a wheel may be mounted upon a spindle 4, in turn mounted on a steering knuckle 5. The steering knuckle is constituted in part by a bracket 10, and has an upper arm 6, which may extend diagonally upwardly for a distance and then horizontally inward. The bracket may include two lower arms 7, as illustrated in Fig. 5. The wheel may be turned on the steering knuckle by means of a suitable steering apparatus, a cross rod of which is shown at 8 connected to the knuckle by an arm 9. It is to be understood that the mounting may be used with wheels which are not dirigible, as for example the rear wheels of automotive vehicles.

Since the mounting for the two wheels as shown herein are identical, the description of one will suffice. The wheel and bracket 10 may have similar movements relative to the vehicle frame and in this regard move together except for the pivotal movement of the wheel on the steering knuckle. Relatively movable members, such as plates or discs, are employed for permitting bracket movement. There may be three of such discs illustrated at 15, 16 and 17, with 16 being the center disc. The arms 6 and 7 may be attached to this center disc and, as shown in Fig. 5, the arm 6 at its end may have oppositely extending portions secured to the center disc by cap screws 18. The forked arms 7 may be secured to the sides of the disc 16 by cap screws 19. Thus, the center disc 16 and the bracket are rigidly united. The center disc is arranged to shift between the discs 15 and 17, and in so doing effect a rocking action of the discs 15 and 17. These discs are mounted on a spindle-like projection 20 of the member 2. As shown in Fig. 7, the discs 15 and 17 may be journaled upon the spindle 20 and these discs may be of circular form as illustrated in Fig. 8. The center disc 16 is provided with slots cut therethrough and it may have a shape as illustrated in Fig. 6. The disc 16 is provided with one slot 21 which may be vertical where a vertical movement of the disc is desired, and another slot 22 extending at an angle to the slot 21, and preferably at a right angle thereto, and these slots may connect into each other. The spindle 20 is situated in the slot 21 and may move into the center portion of the slot 22.

The disc 15 is provided with a pin 23 projecting into the slot 22, as shown in Fig. 6, and a block 24 may be mounted on this pin and arranged to slide in the slot 22. The disc 17 is provided with a pin 25 projecting into the slot 22 of the center disc, and it may be provided with a sliding block 26. These pins may be secured to their respective discs in any suitable manner. As shown in Fig. 7, the discs 15 and 17 are provided with facings 27 and 28, and the pins may have heads 29 underlying the facings to be held in place thereby. These facings are advantageously and preferably of a material for taking the friction upon relative movement of the discs, and to this end the material may be a metal impregnated with a lubricant or substance of a low coefficient of friction. Graphite bronze or similar material is preferred. The several discs may be held in packed relation as by means of a spring 30 located between a nut 31 on the end of the spindle 20 and a washer 32. The ends of the pins 23 and 25 may project into arcuate grooves of opposite discs. These grooves may be formed by cutout portions in the graphite bronze facings as shown in Fig. 8, the groove being illustrated at 33. This in effect stabilizes each pin with a connection near opposite ends to the discs 15 and 17.

It will be apparent by reference to Fig. 6 that if the disc 16 is shifted upwardly relative to the spindle 20, as Fig. 6 is viewed, that the pins 23 and 25 are carried upwardly. The upper limit of movement may be when the spindle 20 strikes the bottom of the slot 21. As the pin 23 moves upwardly it is caused to move in an arc around the spindle 20, due to its connection with the disc 15, and accordingly, as Fig. 6 is viewed, the disc 15 is rotated on the spindle 20 in a counterclockwise direction. At this time the block 24 slides inwardly or toward the center of the slot 22. In the same manner pin 25 moves upwardly but takes an arcuate path around the spindle 20 in a clockwise direction, and the disc 17 rotates clockwise with the block 26 shifting inwardly of the slot 22. When the disc 16 shifts downwardly as Fig. 6 is viewed, the discs 15 and 17 are rocked in the reverse direction.

This movement of the discs 15 and 17 may be employed for spring flexure and to this end disc 15 may have a pin 35, and disc 17 may have a pin 36. These pins may be located on radii shorter than that of the pins 23 and 25 so as to have less movement resulting in a smaller degree of spring flexure.

A pair of coil springs 39 may be employed, and as illustrated in Figs. 3 and 4 they may be disposed with their axes extending lengthwise of the frame. The springs may be housed in suitable retainers 40 and each designed to be compressed by a piston-like member 41 which may telescope over the retainers 40. A link 42 may connect one of the pistons 41, and the pin 36 of the disc 17, the pivotal connection with the piston 41 being illustrated at 43. A link 44 may connect the other piston 41 with the pin 35 of the disc 15. The reciprocating members 41 may slide in ways 46 as illustrated in Figs. 2 and 5. The spring retainers and ways may be mounted between the frame 1 and a bracket 47, spaced from the frame as shown in Figs. 2 and 5.

A condition of the parts which may be a normal condition is illustrated in Figs. 3 and 6, in which condition the relative positions of the spindle 20 and slot 21 may be as illustrated in Fig. 6. When the wheel meets a road irregularity, the impact shifts the disc 16 upwardly, as before described, thus rotating the discs 15 and 17 in opposite directions and compressing the springs as illustrated in Fig. 4. The maximum shift is substantially illustrated in Fig. 4, where the springs are shown compressed. On the rebound the parts may pass the position shown in Fig. 6 with the top wall of the slot 22 making substantial contact with the spindle 20. However, it is preferred that in all normal movements the spindle 20 does not have any impact with the end of the slot 21 or the side of the slot 22. It will be appreciated that the pins 23 and 25 have a greater range of movement than the pins 35 and 36, and the differential in these ranges may be proportioned to obtain the desired differential between wheel movement and spring flexure. As the discs move relative to each other in this manner, friction occurs between their contacting faces and this is taken care of by the graphite bronze facings, as above pointed out. This friction serves to control the movements to some extent, thus relieving the springs of free impact and rebound to make for greater spring life. Inasmuch as the wheel and center disc are united for similar movements, no articulating joints or pivots are necessary, as is the case where the wheel is mounted upon levers. The discs and the connections for the links 42 and 44 may be suitably protected or housed to the end that there are no relatively moving parts exposed to dirt, dust or other extraneous material which would tend to cause an abrading action and result in wear. The structure affords material stability. The width of the several discs is preferably sufficient to provide a bearing on the spindle 20 of sufficient length to take care of torque action on the spindle 20. The disc 16 is stabilized between the discs 15 and 17, which are journaled on snug bearings on the spindle 20. The disc 16 is held against any substantial rotary movement relative to the spindle 20 and is stabilized by the three-point arrangement, comprising the pins 23, 25 and the spindle 20. If the movement should be such that the spindle 20 strikes the top of the slot 22, then the three points are in a straight line and the center disc is stabilized thereby.

The disc arrangement may, if desired, be employed with other wheel mounting arrangements such as levers, as illustrated in Figs. 9 and 10. In this form of the invention the three discs, the springs and other associated parts are the same and need not be described over again. Instead of duplicating the description, the same reference characters have been applied to these parts. The same thing is true of the wheel, spindle and steering knuckle. In this form the steering knuckle includes a bracket member 50 and lever 51, mounted on a fixed pivot 52 and pivoted to the bracket 50 as at 53. This lever may be pivotally connected as at 54 to the center disc 16. A lever of yoke form 55 may be pivoted to the bracket 50 as at 56 with the two arms of the yoke structure pivoted to opposite sides of the disc 16 as at 57. As the wheel shifts relative to the frame, the levers 51 and 55 rock on their pivots. The lever 51 raises the disc 16. The point 54 will move arcuately around the point 52 and a loose connection at 54 may be used to eliminate any binding action in the discs. However, the arcuate movement at 54 is small due to its close position to the fulcrum point 52, so that any binding action is substantially negligible. The levers may be proportioned as to length so that in relative movement between the frame and wheel the distance between the tread lines of opposite wheels is not varied to eliminate any scrubbing action of the wheel on the roadway. To this end the levers may be proportioned as to length, so that the wheel is caused to rock substantially around the point of contact with the ground. This arrangement of levers is known to those versed in the art. However, due to the fact that the lever 55 is mounted on a moving pivot at 56, the difference in the lengths between the levers 51 and 55 need not be so great as that difference which is now required to maintain a constant tread width.

In some of the claims appended hereto, the term "disc" and the term "plate" is used as descriptive of the members 15, 16 and 17. These terms are to be construed liberally as words of description rather than words of limitation and are to be construed to cover such members, although they may not be shaped technically in the form of discs or plates.

When an automotive vehicle is rounding a corner or curve the centrifugal action tends to flex the outer springs, both front and rear, and the body sways outwardly, and this unstable feature is undesirable. This unstable condition is increased and made more undesirable with relatively flexible spring mountings such as have heretofore and are now used in the individual spring mounting of wheels as the outward force has a more or less direct action upon the springs to flex them. The structure of the present invention affords much desired stability in this regard. In this structure there is a tendency to compact the several discs together or to create the forces which are applied to the discs angularly as regards the axis, so that this outward force is not communicated directly to the springs. Accordingly, the wheel mounting herein minimizes this unstable feature as the outside springs are not substantially flexed by the centrifugal force, and the desired stability is obtained. At the same time, however, ample wheel movement is provided for when the wheel meets road irregularities or the like.

I claim:

1. A mechanical movement comprising a support, a disc rotatably mounted thereon, a second disc rotatably mounted thereon, a third disc positioned between the first mentioned discs and reciprocably mounted upon the support in the plane of the third disc, and means connecting the third disc with the other two discs substantially on opposite sides of the support and arranged to rock said other two discs on the support in opposite directions upon reciprocable movement of the third disc.

2. A mechanical movement comprising a support, a disc rotatably mounted thereon, a second disc rotatably mounted thereon, a third disc positioned between the first mentioned discs and reciprocably mounted upon the support in the plane of the third disc, said third disc being slotted, the first and second named discs each having a pin secured thereto and projecting into a slot in the third disc, the said pins being so located that reciprocable movement of the third disc rocks, by crank action, the first mentioned discs in opposite directions around the support.

3. A mechanical movement comprising a support, two members rotatably mounted thereon, a third member positioned between the said two members and reciprocably mounted on the support in a direction substantially normal to the axis of the support, said third member having a slot for accommodating the support, said third member having another slot positioned substantially at right angles to the first mentioned slot, each of said two members having a pin disposed eccentrically of the support, said pins extending into the second mentioned slot in the third member adjacent opposite ends thereof, whereby reciprocable movement of the third member rocks the said two members on the support in opposite directions.

4. A mechanical movement comprising a support, two members rotatably mounted thereon, a third member positioned between the said two members and reciprocably mounted on the support in a direction substantially normal to the axis of the support, said third member having a slot for accommodating the support, said third member having another slot positioned substantially at right angles to the first mentioned slot, each of said two members having a pin disposed eccentrically of the support, said pins extending into the second mentioned slot in the third member adjacent opposite ends thereof whereby reciprocable movement of the third member rocks the said two members on the support in opposite directions, and means for urging the members into frictional engagement.

5. A mechanical movement comprising a support, two members rotatably mounted thereon, a third member positioned between the said two members and reciprocably mounted on the support in a direction substantially normal to the axis of the support, said third member having a slot for accommodating the support, said third member having another slot positioned substantially at right angles to the first mentioned slot, each of said two members having a pin disposed eccentrically of the support, said pins extending into the second mentioned slot in the third member adjacent opposite ends thereof, whereby reciprocable movement of the third member rocks the said two members on the support in opposite directions, means for urging the members into frictional engagement, and an anti-friction facing material between the third member and said two members.

6. A mechanical movement comprising a support, two members rotatably mounted thereon, a third member positioned between the said two members and reciprocably mounted on the support in a direction substantially normal to the axis of the support, said third member having a slot for accommodating the support, said third member having another slot positioned substantially at right angles to the first mentioned slot, each of said two members having a pin disposed eccentrically of the support, said pins extending into the second mentioned slot in the third member adjacent opposite ends thereof, whereby reciprocable movement of the third member rocks the said two members on the support in opposite directions, means for urging the members into frictional engagement, and graphite bronze facing material between the members.

7. A mounting for a vehicle wheel comprising a support, a pair of members rotatably mounted thereon, a third member reciprocably mounted thereon, a wheel, means connecting the wheel to the third member, said third member being slotted, each of the first two members having a pin projecting into the slot of the third member with the pins so disposed that reciprocable movement of the third member rocks the said two members on the support in opposite directions, and means for holding said members in frictional engagement with each other.

8. A vehicle wheel mounting comprising a support on the vehicle, a pair of members rotatably mounted upon the support, a third member positioned between the pair of members and reciprocably mounted upon the support, said support extending transversely of the vehicle frame, a wheel, means connecting the wheel to a third member, said third member having a slot running substantially lengthwise of the vehicle frame, a pin on each of said pair of members with the pins extending into opposite end portions of the slot, whereby reciprocable movement of the third member rocks said pair of members oppositely on the support, a pair of coil springs extending lengthwise of the frame, and links connecting each of said pair of members with one of the springs.

9. A mounting for a vehicle wheel comprising a support fastened to the vehicle frame, a pair of members rotatably mounted upon a support, another member shiftable on the support in a substantially vertical direction, a wheel, a bracket rigidly connecting the wheel and the third member, a pin and slot connection between the third member and each of said rotatably mounted members, so arranged that shifting movement of the third member rocks the pair of members upon the support in opposite directions, and spring means associated with each of the rotatable members to be flexed upon rocking action of said members.

10. A vehicle wheel mounting comprising a support, a pair of members rotatably mounted upon the support, a third member positioned between the pair of members and shiftable on the support in a substantially vertical direction, a pin and slot connection between the third member and each of the said rotatable members arranged to rock the rotatable members on the support in opposite directions upon shift of the third member, spring means associated with each rockable member, a wheel, and lever arms interconnecting the wheel and the vehicle frame and the third member.

11. A vehicle wheel mounting comprising a support, a pair of members rotatably mounted upon the support, a third member positioned between the pair of members and shiftable on the support in a substantially vertical direction, a pin and slot connection between the third member and each of the said rotatable members arranged to rock the rotatable members on the support in opposite directions upon shift of the third member, spring means associated with each rockable member, a wheel, a lever arm pivotally connecting the wheel to the frame, means connecting the lever to the said third member, and links pivotally connecting the wheel and said third member.

12. A mechanical movement comprising, a fixed spindle-like support, a member on the support and reciprocable on the support in a direction which is at an angle to the axis of the spindle, a pair of members journaled on the spindle-like support, and connections between the first member and each of said pair of members for rocking said pair of members on the spindle-like support in opposite directions upon reciprocable movement of said first member.

13. A mechanical movement comprising, a fixed spindle-like support, a member on the support and reciprocable on the support in a direction which is at an angle to the axis of the spindle, a pair of members journaled on the spindle, connections between the first member and each of the pair of members for rocking said pair of members on the spindle in opposite directions upon reciprocable movement of the first members, and spring means associated with the said pair of members arranged to be flexed thereby upon the rocking of said members.

14. A mechanical movement comprising, a fixed spindle-like support, a member on the support and reciprocable on the support in a direction which is at an angle to the axis of the spindle, a pair of members journaled on the spindle, connections between the first member and each of the pair of members for rocking said pair of members on the spindle in opposite directions upon reciprocable movement of the first member, a coil spring for each of said pair of members, movable means for acting upon said springs, and a link interconnecting each of said pair of members with one of the movable means whereby reciprocable movement of the first mentioned member flexes the springs.

15. A mechanical movement comprising, a fixed spindle-like support, a member mounted for reciprocable movement on the support in a direction which is at an angle to the axis of the spindle, a pair of members journaled on the spindle, means for packing all of said members together whereby they have contacting and rubbing surfaces, connections between the first member and each of the said pair of members for rocking said pair of members on the spindle in opposite directions upon reciprocable movement of the first member, and spring means associated with said pair of members to be flexed by the rocking movement thereof.

16. A mechanical movement comprising, a fixed spindle-like support, a slotted plate on the support reciprocable in a direction which is at an angle to the axis of the spindle, a pair of plates journaled on the spindle one on each side of the first mentioned plate, connections between the first mentioned plate and each of the two second mentioned plates for rocking the two second mentioned plates on the spindle in opposite directions upon reciprocable movement of the first mentioned plate, and spring means associated with the second mentioned plates arranged to be flexed by the rocking movement of said plates.

17. A vehicle wheel mounting comprising, a spindle-like support carried by the vehicle, a member mounted upon the support for reciprocable movement in a direction which is at an angle to the axis of the support, a pair of members journaled on the support, connections between the first mentioned member and each of the said pair of members for rocking said pair of members on the spindle in opposite directions upon reciprocable movement of the first mentioned member, a wheel, means connecting the wheel to the first mentioned member, and spring means associated with the two rocking members arranged to be flexed by the rocking movement thereof.

18. A vehicle wheel mounting comprising, a spindle-like support carried by the vehicle, a slotted plate mounted upon the support for reciprocable movement thereon in a direction at an angle to the axis of the spindle, a pair of plates journaled on the spindle one on each side of the first mentioned plate, connections between the first mentioned plate and each of the second mentioned plates for rocking said second mentioned plates on the spindle in opposite directions upon reciprocable movement of the first mentioned plate, a wheel, means connecting the wheel to the first mentioned plate, and spring means associated with the said journaled plates and arranged to be flexed thereby upon the rocking thereof.

19. A vehicle wheel mounting comprising, a spindle-like support carried by the vehicle, a slotted plate mounted upon the support for reciprocable movement thereon in a direction at an angle to the axis of the spindle, a pair of plates journaled on the spindle one on each side of the first mentioned plate, means packing the plates together in frictional engagement, connections between the first mentioned plate and each of the second mentioned plates for rocking said second mentioned plates on the spindle in opposite directions upon reciprocable movement of the first mentioned plate, a wheel, means connecting the wheel to the first mentioned plate, and spring means associated with the said journaled plates and arranged to be flexed thereby upon the rocking thereof.

20. A vehicle wheel mounting comprising, a spindle-like support carried by the vehicle, a slotted plate mounted upon the support for reciprocable movement thereon in a direction at an angle to the axis of the spindle, a pair of plates journaled on the spindle one on each side of the first mentioned plate, connections between the first mentioned plate and each of the second mentioned plates for rocking said second mentioned plates on the spindle in opposite directions upon reciprocable movement of the first mentioned plate, a wheel, means connecting the wheel to the first mentioned plate, a pair of coil springs carried by the vehicle with their axes disposed lengthwise of the vehicle, and means operatively associating each spring with one of the journaled plates whereby to flex the springs upon rocking of the plates.

21. A wheel mounting comprising, in combination with a vehicle frame, a supporting member secured to the frame, means reciprocably mounted upon the supporting member, a wheel, a spindle upon which the wheel revolves, a lever pivotally connected to the frame and connected to the spindle, means connecting the lever to the reciprocably mounted member, a link connecting the spindle to the reciprocably mounted member, and spring means arranged to be flexed upon reciprocable movement of said reciprocably mounted member.

22. A wheel mounting comprising, in combination with a vehicle frame, a supporting member secured to the frame, means reciprocably mounted upon the supporting member for movement in a substantially vertical direction, a wheel, a spindle upon which the wheel revolves, a lever pivotally connected to the frame and connected to the spindle, means connecting the lever to the reciprocably mounted member, a link connecting the spindle to the reciprocably mounted member, and spring means arranged to be flexed upon reciprocable movement of said reciprocably mounted member.

23. A vehicle wheel mounting comprising, in combination with a vehicle frame, a supporting member secured to the frame, means reciprocably mounted upon the supporting member for movement in a substantially vertical direction, a wheel, a spindle therefor, a lever pivoted to the frame and connected to the spindle, means connecting said lever to the uppermost portion of the reciprocably mounted member, a link connecting the spindle to the lowermost portion of the reciprocably mounted member, and spring means arranged to be flexed upon reciprocable movement of the said reciprocably mounted member.

24. A vehicle wheel mounting comprising, in combination with a vehicle frame, a supporting member secured to the frame, means reciprocably mounted upon the supporting member for movement in a substantially vertical direction, a wheel, a spindle therefor, a lever pivoted to the frame and connected to the spindle, means connecting said lever to the reciprocably mounted member, a link connecting the spindle to the reciprocably mounted member, coil spring means disposed with their axes in a substantially horizontal position and extending fore and aft of the vehicle frame, and means operatively associating the reciprocably mounted member with the spring means for flexing the same on reciprocable movement of the reciprocably mounted members.

25. A wheel mounting for a vehicle comprising in combination with the vehicle frame, a member mounted on one side of the vehicle frame for movement substantially in a vertical direction, a wheel connected to the member, a member rockably mounted on the side of the frame and positioned for surface to surface frictional engagement with the first mentioned member, means interconnecting the first mentioned member with the rockably mounted member whereby movement of the first mentioned member in a substantially vertical direction rocks the second member while the members are in frictional engagement, a coil spring positioned with its axis extending substantially fore and aft of the vehicle frame, and means operatively connecting the rockable member and said spring, whereby shift of the first mentioned member in a substantially vertical direction flexes the spring in a direction substantially fore and aft of the vehicle frame through the intermediate rockable member.

26. A wheel mounting for a vehicle comprising in combination with a vehicle frame, a member mounted on one side of the frame for movement substantially in a vertical direction, a wheel connected to the member, a pair of members rockably mounted on said side of the vehicle frame and in frictional engagement with the first mentioned member, means interconnecting the first mentioned member with the rockable members whereby shift of the first mentioned member in a substantially vertical direction rocks the rockable members in opposite directions, a pair of substantially opposed coil springs, one positioned forward of the first mentioned member and one positioned rearward thereof, said springs having their axes disposed in a direction extending substantially fore and aft of the vehicle frame, means operatively connecting one rockable member with one spring, and means operatively connecting the other rockable member with the other spring, whereby movement of the first mentioned member in a substantially vertical direction flexes said springs in a substantially fore and aft direction through the intermediate rockable members.

SAMUEL D. BUTTERWORTH.